(12) United States Patent
Yokoyama

(10) Patent No.: US 8,243,251 B2
(45) Date of Patent: Aug. 14, 2012

(54) LIQUID CRYSTAL FRESNEL LENS

(75) Inventor: Masafumi Yokoyama, Itabashi-ku (JP)

(73) Assignee: Citizen Holdings Co., Ltd., Tokyo (JP)

( * ) Notice: Subject to any disclaimer, the term of this patent is extended or adjusted under 35 U.S.C. 154(b) by 158 days.

(21) Appl. No.: 12/744,505

(22) PCT Filed: Dec. 5, 2008

(86) PCT No.: PCT/JP2008/072585
§ 371 (c)(1),
(2), (4) Date: May 25, 2010

(87) PCT Pub. No.: WO2009/072670
PCT Pub. Date: Jun. 11, 2009

(65) Prior Publication Data
US 2010/0245743 A1    Sep. 30, 2010

(30) Foreign Application Priority Data

Dec. 6, 2007  (JP) .................................. 2007-315661

(51) Int. Cl.
*G02F 1/13* (2006.01)
(52) U.S. Cl. ...................................................... 349/201
(58) Field of Classification Search .................. 349/201
See application file for complete search history.

(56) References Cited

U.S. PATENT DOCUMENTS

2005/0231677 A1   10/2005   Meredith
2006/0164593 A1*  7/2006   Peyghambarian et al. ... 349/200

FOREIGN PATENT DOCUMENTS

| JP | 9-211460 A | 8/1997 |
| JP | 2005-024917 A | 1/2005 |
| JP | 2006-145957 A | 6/2006 |
| WO | WO 2006-078806 A2 | 7/2006 |

OTHER PUBLICATIONS

International Search Report of PCT/JP2008/072585, Mar. 24, 2009.

* cited by examiner

*Primary Examiner* — James Dudek
(74) *Attorney, Agent, or Firm* — Ditthavong Mori & Steiner, P.C.

(57) ABSTRACT

The present invention is directed to the provision of a liquid crystal Fresnel lens that achieves high focusing performance. The liquid crystal Fresnel lens according to the present invention includes a concentrically segmented ring-shaped electrode group, a common electrode disposed opposite the ring-shaped electrode group, a liquid crystal layer provided between the ring-shaped electrode group and the common electrode, a first lens segment region which includes a first plurality of ring-shaped electrodes from the ring-shaped electrode group, and which forms a first retardation distribution by utilizing the first plurality of ring-shaped electrodes, and a second lens segment region which includes a second plurality of ring-shaped electrodes from the ring-shaped electrode group, the second plurality of ring-shaped electrodes being located outwardly of the first plurality of ring-shaped electrodes, and which forms a second retardation distribution by utilizing the second plurality of ring-shaped electrodes, wherein a Fresnel lens-like retardation distribution is formed across the first and second lens segment regions, and the number of the second plurality of ring-shaped electrodes is made smaller than the number of the first plurality of ring-shaped electrodes.

5 Claims, 13 Drawing Sheets

Fig. 8

| Ring-shaped electrode | Lens Segment 1(1) | | Ring-shaped electrode Lens Segment 1(2) | | Ring-shaped electrode Lens Segment 1(5) | | Ring-shaped electrode Lens Segment 1(6) | | Ring-shaped electrode Lens Segment 1(11) | |
|---|---|---|---|---|---|---|---|---|---|---|
| Retardations (nm) | | Radius (mm) | | Radius (mm) | | Radius (mm) | | Radius (mm) | | Radius (mm) |
| 3000 | 1 | 0 | 1 | 1.096 | 1 | 2.191 | 1 | 2.45 | 1 | 3.464 |
| 2875 | 2 | 0.224 | | | | | | | | |
| 2750 | 3 | 0.316 | 2 | 1.14 | 2 | 2.214 | | | | |
| 2625 | 4 | 0.387 | | | | | 2 | 2.48 | 2 | 3.486 |
| 2500 | 5 | 0.447 | 3 | 1.183 | 3 | 2.236 | | | | |
| 2375 | 6 | 0.5 | | | | | | | | |
| 2250 | 7 | 0.548 | 4 | 1.225 | 4 | 2.258 | 3 | 2.51 | 3 | 3.507 |
| 2125 | 8 | 0.592 | | | | | | | | |
| 2000 | 9 | 0.633 | 5 | 1.265 | 5 | 2.28 | | | | |
| 1875 | 10 | 0.671 | | | | | | | | |
| 1750 | 11 | 0.707 | 6 | 1.304 | 6 | 2.302 | 4 | 2.54 | 4 | 3.528 |
| 1625 | 12 | 0.742 | | | | | | | | |
| 1500 | 13 | 0.775 | 7 | 1.342 | 7 | 2.324 | | | | |
| 1375 | 14 | 0.806 | | | | | 5 | 2.569 | 5 | 3.56 |
| 1250 | 15 | 0.837 | 8 | 1.378 | 8 | 2.345 | | | | |
| 1125 | 16 | 0.866 | | | | | | | | |
| 1000 | 17 | 0.894 | 9 | 1.414 | 9 | 2.366 | 6 | 2.598 | 6 | 3.571 |
| 875 | 18 | 0.922 | | | | | | | | |
| 750 | 19 | 0.949 | 10 | 1.449 | 10 | 2.387 | | | | |
| 625 | 20 | 0.975 | | | | | 7 | 2.627 | 7 | 3.592 |
| 500 | 21 | 1 | 11 | 1.483 | 11 | 2.408 | | | | |
| 375 | 22 | 1.025 | | | | | | | | |
| 250 | 23 | 1.049 | 12 | 1.517 | 12 | 2.429 | 8 | 2.655 | 8 | 3.612 |
| 125 | 24 | 1.072 | | | | | | | | |
| 0 | 25 | 1.096 | 13 | 1.55 | 13 | 2.45 | 9 | 2.684 | 9 | 3.633 |
| Number of ring-shaped electrodes | 25 | | 13 | | 13 | | 9 | | 9 | |
| The percentage of the area that the inter-zone gap occupies in each lens segment | 3.00% | | 2.70% | | 4.65% | | 3.44% | | 4.75% | |

Fig. 9

| RING-SHAPED ELECTRODE LENS SEGMENT 1(12) | | RING-SHAPED ELECTRODE LENS SEGMENT 1(13) | | RING-SHAPED ELECTRODE LENS SEGMENT 1(21) | | RING-SHAPED ELECTRODE LENS SEGMENT 1(22) | | RING-SHAPED ELECTRODE LENS SEGMENT 1(41) | | RING-SHAPED ELECTRODE LENS SEGMENT 1(47) | |
|---|---|---|---|---|---|---|---|---|---|---|---|
| | RADIUS (mm) | | RADIUS (mm) | | RADIUS (mm) | | RADIUS (mm) | | RADIUS (mm) | | RADIUS (mm) |
| 1 | 3.633 | 1 | 3.795 | 1 | 4.899 | 1 | 5.02 | 1 | 6.928 | 1 | 7.43 |
| 2 | 3.654 | 2 | 3.821 | 2 | 4.919 | | | | | | |
| 3 | 3.674 | | | | | | | | | | |
| 4 | 3.695 | 3 | 3.847 | 3 | 4.94 | 2 | 5.06 | 2 | 6.957 | 2 | 7.457 |
| ~5 | 3.715 | 4 | 3.873 | ~4 | 4.96 | ~ | | ~ | | ~ | |
| 6 | 3.735 | 5 | 3.899 | 5 | 4.98 | | | | | | |
| 7 | 3.755 | | | | | 3 | 5.099 | 3 | 6.986 | 3 | 7.483 |
| 8 | 3.775 | 6 | 3.924 | 6 | 5 | | | | | | |
| 9 | 3.795 | 7 | 3.95 | 7 | 5.02 | 4 | 5.138 | 4 | 7.014 | 4 | 7.51 |
| 9 | | 7 | | 7 | | 4 | | 4 | | 4 | |
| 4.95% | | 3.88% | | 4.97% | | 2.55% | | 3.50% | | 3.76% | |

Fig.10

| RING-SHAPED ELECTRODE | | LENS SEGMENT 1(1) | LENS SEGMENT 1(2) | LENS SEGMENT 1(11) | LENS SEGMENT 1(21) | LENS SEGMENT 1(41) |
|---|---|---|---|---|---|---|
| RETARDATIONS (nm) | | RADIUS (mm) | RADIUS (mm) | RADIUS (mm) | RADIUS (mm) | RADIUS (mm) |
| 3000 | 1 | 0 | 1.096 | 3.464 | 4.899 | 6.928 |
| 2875 | 2 | 0.224 | 1.118 | 3.471 | 4.904 | 6.932 |
| 2750 | 3 | 0.316 | 1.14 | 3.479 | 4.909 | 6.935 |
| 2625 | 4 | 0.387 | 1.162 | 3.486 | 4.914 | 6.939 |
| 2500 | 5 | 0.447 | 1.183 | 3.493 | 4.919 | 6.943 |
| 2375 | 6 | 0.5 | 1.204 | 3.5 | 4.924 | 6.946 |
| 2250 | 7 | 0.548 | 1.225 | 3.507 | 4.93 | 6.95 |
| 2125 | 8 | 0.592 | 1.245 | 3.514 | 4.935 | 6.953 |
| 2000 | 9 | 0.633 | 1.265 | 3.521 | 4.94 | 6.957 |
| 1875 | 10 | 0.671 | 1.285 | 3.528 | 4.945 | 6.961 |
| 1750 | 11 | 0.707 | 1.304 | 3.536 | 4.95 | 6.964 |
| 1625 | 12 | 0.742 | 1.323 | 3.543 | 4.955 | 6.968 |
| 1500 | 13 | 0.775 | 1.342 | 3.55 | 4.96 | 6.971 |
| 1375 | 14 | 0.806 | 1.36 | 3.557 | 4.965 | 6.975 |
| 1250 | 15 | 0.837 | 1.378 | 3.564 | 4.97 | 6.979 |
| 1125 | 16 | 0.866 | 1.396 | 3.571 | 4.975 | 6.982 |
| 1000 | 17 | 0.894 | 1.414 | 3.578 | 4.98 | 6.986 |
| 875 | 18 | 0.922 | 1.432 | 3.585 | 4.985 | 6.989 |
| 750 | 19 | 0.949 | 1.449 | 3.592 | 4.99 | 6.993 |
| 625 | 20 | 0.975 | 1.466 | 3.599 | 4.995 | 6.996 |
| 500 | 21 | 1 | 1.483 | 3.606 | 5 | 7 |
| 375 | 22 | 1.025 | 1.5 | 3.612 | 5.005 | 7.004 |
| 250 | 23 | 1.049 | 1.517 | 3.619 | 5.01 | 7.007 |
| 125 | 24 | 1.072 | 1.533 | 3.626 | 5.015 | 7.011 |
| 0 | 25 | 1.096 | 1.55 | 3.633 | 5.02 | 7.014 |
| NUMBER OF RING-SHAPED ELECTRODES | | 25 | 25 | 25 | 25 | 25 |
| THE PERCENTAGE OF THE AREA THAT THE INTER-ZONE GAP OCCUPIES IN EACH LENS SEGMENT | | 3.00% | 5.37% | 14.22% | 19.84% | 27.91% |

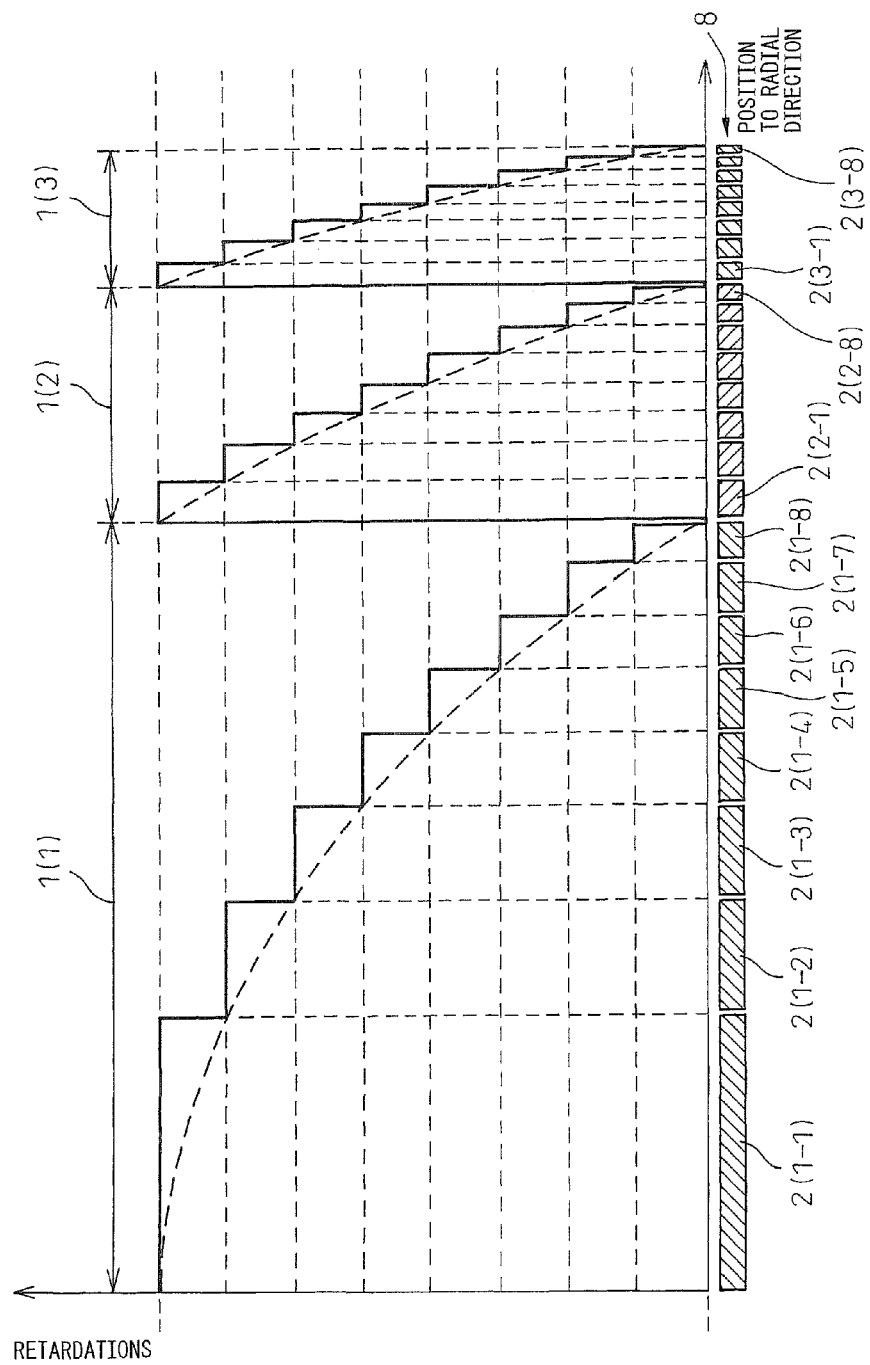

LIQUID CRYSTAL FRESNEL LENS

FIELD OF THE INVENTION

The present invention relates to a liquid crystal Fresnel lens, and in particular to a liquid crystal Fresnel lens which forms a Fresnel lens-like retardation distribution in a liquid crystal layer sandwiched between a ring-shaped electrode group and a common electrode.

BACKGROUND OF THE INVENTION

A liquid crystal Fresnel lens is proposed that forms a Fresnel lens-like retardation distribution in a liquid crystal layer by utilizing ring-shaped electrodes (refer, for example, to patent document 1).

FIG. 11 is a cross-sectional view of a prior art liquid crystal Fresnel lens.

In the liquid crystal Fresnel lens 30, a liquid crystal 12 is provided between top and bottom transparent substrates 11, and a seal material 13 is placed so as to cover the periphery of the liquid crystal 12. A common electrode 9 and a ring-shaped electrode group 8 are formed on the sides of the top and bottom transparent substrates 11 that face the liquid crystal 12.

In the liquid crystal Fresnel lens 30, the retardation distribution in the liquid crystal 12 is varied by applying voltage between the common electrode 9 and the concentrically segmented ring-shaped electrode group 8 with the voltage being varied for each ring-shaped electrode. The liquid crystal Fresnel lens 30 thus produces a lens effect.

FIG. 12 is a plan view schematically showing the ring-shaped electrode group formed in the prior art liquid crystal Fresnel lens 30.

As shown in FIG. 12, the ring-shaped electrode group 8 comprises a plurality of ring-shaped electrodes 2 arranged concentrically about the center 4. The ring-shaped electrodes 2, which are not necessarily equal in width, are formed in such a manner so as to be separated from each other by a prescribed inter-zone gap 3. In this inter-zone gap 3, no potential is applied to the liquid crystal layer which therefore does not function as a lens in the gap region. It is therefore desirable to form the inter-zone gap 3 as narrow as possible. However, the inter-zone gap 3 is formed with a prescribed width in order to prevent leakage between adjacent ring-shaped electrodes.

Lead wires 5 for applying voltages to the respective ring-shaped electrodes 2 are formed on the ring-shaped electrodes 2 by interposing therebetween an insulating layer not shown. Each lead wire 5 is connected to a designated one of the ring-shaped electrodes 2 by means of a via 6. The lead wires 5 are connected to a driver circuit IC 7. The driver circuit IC 7 is connected to a power supply circuit, etc., not shown, and applies a prescribed voltage to each ring-shaped electrode 2 via a corresponding one of the lead wires 5.

FIG. 13 is a diagram showing the relationship between the ring-shaped electrodes formed in the prior art liquid crystal Fresnel lens 30 and the retardations formed in the liquid crystal layer.

In the liquid crystal Fresnel lens 30 shown in FIGS. 12 and 13, eight ring-shaped electrodes 2 correspond to one lens segment 1. The ring-shaped electrodes 2 belonging to different lens segments 1 but having the same number as counted from the center are supplied with the same voltage via the same lead wire 5 and through the respective via 6.

As shown in FIGS. 12 and 13, the retardation distribution in the lens segment 1(1) is formed by the ring-shaped electrodes 2(1-1) to 2(1-8), the retardation distribution in the lens segment 1(2) is formed by the ring-shaped electrodes 2(2-1) to 2(2-8), and the retardation distribution in the lens segment 1(3) is formed by the ring-shaped electrodes 2(3-1) to 2(3-8). Voltages are applied to the ring-shaped electrodes 2(1-1) to 2(1-8), 2(2-1) to 2(2-8), and 2(3-1) to 2(3-8) via the respective lead wires 5(1) to 5(8). For convenience of illustration, only the lens segments 1(1) and 1(2) are shown in FIG. 12.

The ring-shaped electrodes 2 for forming the retardation distribution in each lens segment 1 are formed in such a manner that the ring-shaped electrodes located farther away from the center have smaller widths. That is, compared with the width of the ring-shaped electrode 2(1-2), the width of the ring-shaped electrode 2(1-3) located farther away from the center is small, and compared with the width of the ring-shaped electrode 2(1-3), the width of the ring-shaped electrode 2(1-4) located farther away from the center is small.

Further, the width of the lens segment 1 across which the retardation distribution is formed becomes smaller as the lens segment 1 is located farther away from the center. That is, the width of the retardation distribution formed by the lens segment 1(1) is wider than the width of the retardation distribution formed by the lens segment 1(2) located farther away from the center.

Patent Document 1: United States Patent Application No. 2005/0231677

SUMMARY OF THE INVENTION

In the prior art liquid crystal Fresnel lens, the retardation distribution of any lens segment is carried out using the same number of ring-shaped electrodes. On the other hand, the width of the lens segment across which the retardation distribution is formed becomes smaller as the lens segment is located farther away from the center. However, the ring-shaped electrodes are formed, one separated from another by a prescribed inter-zone gap. As a result, the ratio of the area that the inter-zone gap occupies in the region where the retardation distribution is formed in the lens segment becomes larger as the lens segment is located farther away from the center and nearer to the outer periphery of the lens.

As earlier noted, in the inter-zone gap, no potential is applied to the liquid crystal layer which therefore does not function as a lens in the gap region. Specifically, in a liquid crystal Fresnel lens, a Fresnel lens-like retardation distribution is formed using many lens segments, and the retardation distribution in each lens segment is formed using many ring-shaped electrodes. Accordingly, if the region that does not function as a lens becomes larger toward the outer periphery of the lens, there arise the problem that the focusing performance of the lens degrades.

It is an object of the present invention to provide a liquid crystal Fresnel lens that can overcome the above problem.

It is another object of the present invention to provide a liquid crystal Fresnel lens that achieves high focusing performance.

A liquid crystal Fresnel lens according to the present invention includes a concentrically segmented ring-shaped electrode group, a common electrode disposed opposite the ring-shaped electrode group, a liquid crystal layer provided between the ring-shaped electrode group and the common electrode, a first lens segment region which includes a first plurality of ring-shaped electrodes from the ring-shaped electrode group, and which forms a first retardation distribution by utilizing the first plurality of ring-shaped electrodes; and a second lens segment region which includes a second plurality of ring-shaped electrodes from the ring-shaped electrode group, the second plurality of ring-shaped electrodes being located outwardly of the first plurality of ring-shaped electrodes, and which forms a second retardation distribution by utilizing the second plurality of ring-shaped electrodes, wherein a Fresnel lens-like retardation distribution is formed across the first and second lens segment regions, and the number of the second plurality of ring-shaped electrodes is made smaller than the number of the first plurality of ring-shaped electrodes.

Preferably, the liquid crystal Fresnel lens according to the present invention further comprises diving voltage application means for applying a given driving voltage to a designated one of the first plurality of ring-shaped electrodes that generates a given retardation and applying the same given driving voltage to a corresponding one of the second plurality of ring-shaped electrodes that generates a retardation identical to the given retardation.

Further preferably, in the liquid crystal Fresnel lens according to the present invention, in the first lens segment region, the first plurality of ring-shaped electrodes are formed so that the difference between the retardations generated by the ring-shaped electrodes becomes equal between any two adjacent ones of the ring-shaped electrodes.

In a liquid crystal Fresnel lens according to the present invention, a liquid crystal layer is provided between a ring-shaped electrode group includes a plurality of concentrically arranged ring-shaped electrodes and a common electrode disposed opposite the ring-shaped electrode group, and a Fresnel lens-like refractive index distribution of the lens formed from a plurality of concentrically arranged lens segments is formed in the liquid crystal layer by utilizing the ring-shaped electrode group and the common electrode, wherein a refractive index distribution in each lens segment is formed by utilizing a plurality of ring-shaped electrodes, and wherein the number of ring-shaped electrodes in the lens segment decreases as the lens segment is located farther away from the center and nearer to the outer periphery of the lens.

In the liquid crystal Fresnel lens according to the present invention, each designated ring-shaped electrode contained in each lens segment is supplied with a driving voltage equal to that applied to a corresponding one of the ring-shaped electrodes contained in an inwardly located lens segment that forms a refractive index distribution identical to that formed by the designated one ring-shaped electrode.

Thus, according to the present invention, since the ratio of the area occupied by the inter-zone gap, i.e., the region that does not function as a lens, is prevented from increasing even in the outwardly located narrow lens segment, it is possible to obtain a liquid crystal Fresnel lens that achieves high focusing performance and good visibility even when the lens has a large diameter, and that can easily vary the focal length by switching the applied voltage.

Further, according to the liquid crystal Fresnel lens of the present invention, since the ratio of the area occupied by the inter-zone gap, i.e., the region that does not function as a lens, is prevented from increasing even in the outwardly located narrow lens segment, the area that contributes to focusing can be increased, thereby making it possible to increase the amount of light that can be focused through the liquid crystal Fresnel lens.

BRIEF DESCRIPTION OF THE DRAWINGS

FIG. 8 is a diagram showing a first example (part 1) of the liquid crystal Fresnel lens according to the present invention.

FIG. 9 is a diagram showing the first example (part 2) of the liquid crystal Fresnel lens according to the present invention.

FIG. 10 is a diagram showing a comparative design example of a liquid crystal Fresnel lens.

FIG. 13 is an explanatory diagram illustrating the retardation for each ring-shaped electrode in the prior art liquid crystal Fresnel lens.

DETAILED DESCRIPTION OF THE PREFERRED EMBODIMENT

A liquid crystal Fresnel lens according to the present invention will be described in detail below with reference to the drawings. It should, however, be noted that the technical scope of the present invention is not limited to the specific embodiments described herein, but extends to the inventions described in the appended claims and their equivalents.

Figure 1:
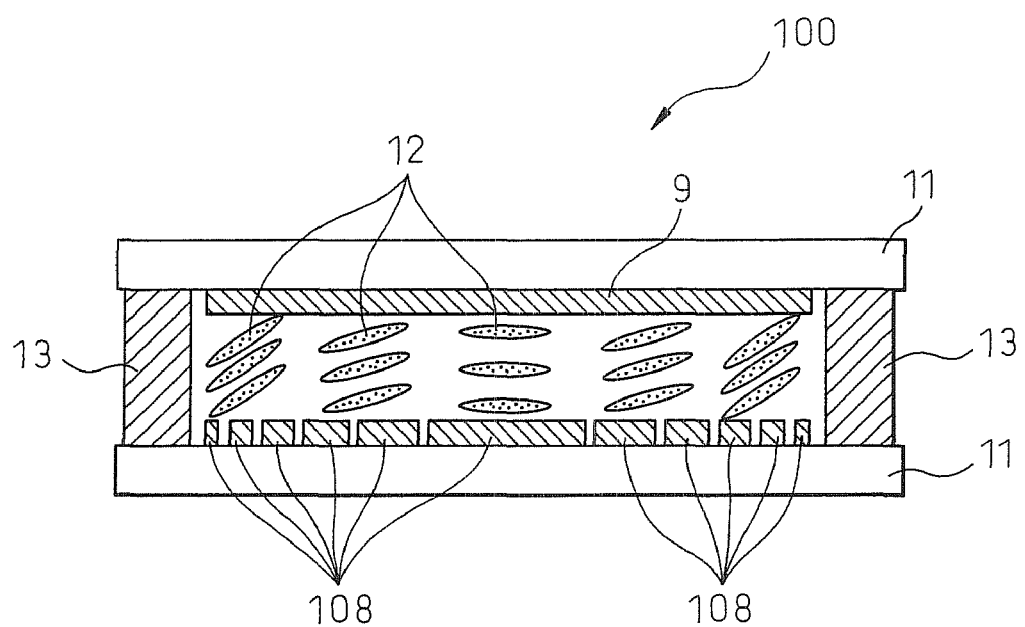
FIG. 1 is a schematic cross-sectional view of a liquid crystal Fresnel lens according to the present invention.

FIG. 1 is a schematic cross-sectional view of the liquid crystal Fresnel lens according to the present invention.

Figure 11:
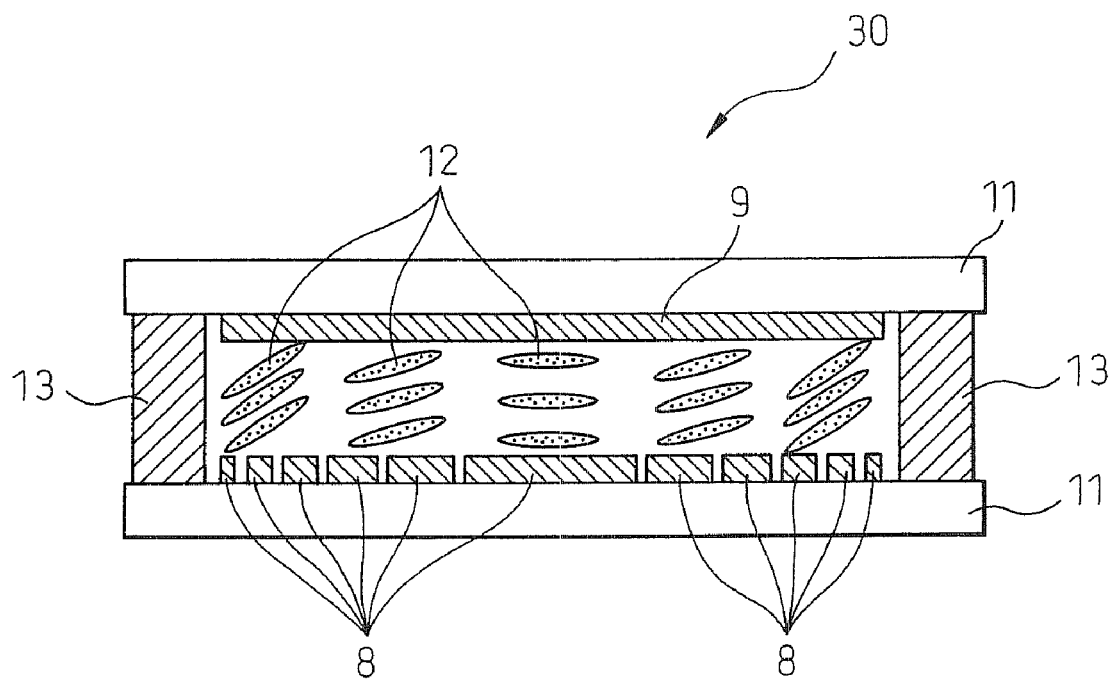
FIG. 11 is a cross-sectional view of a prior art liquid crystal Fresnel lens.
Figure 12:
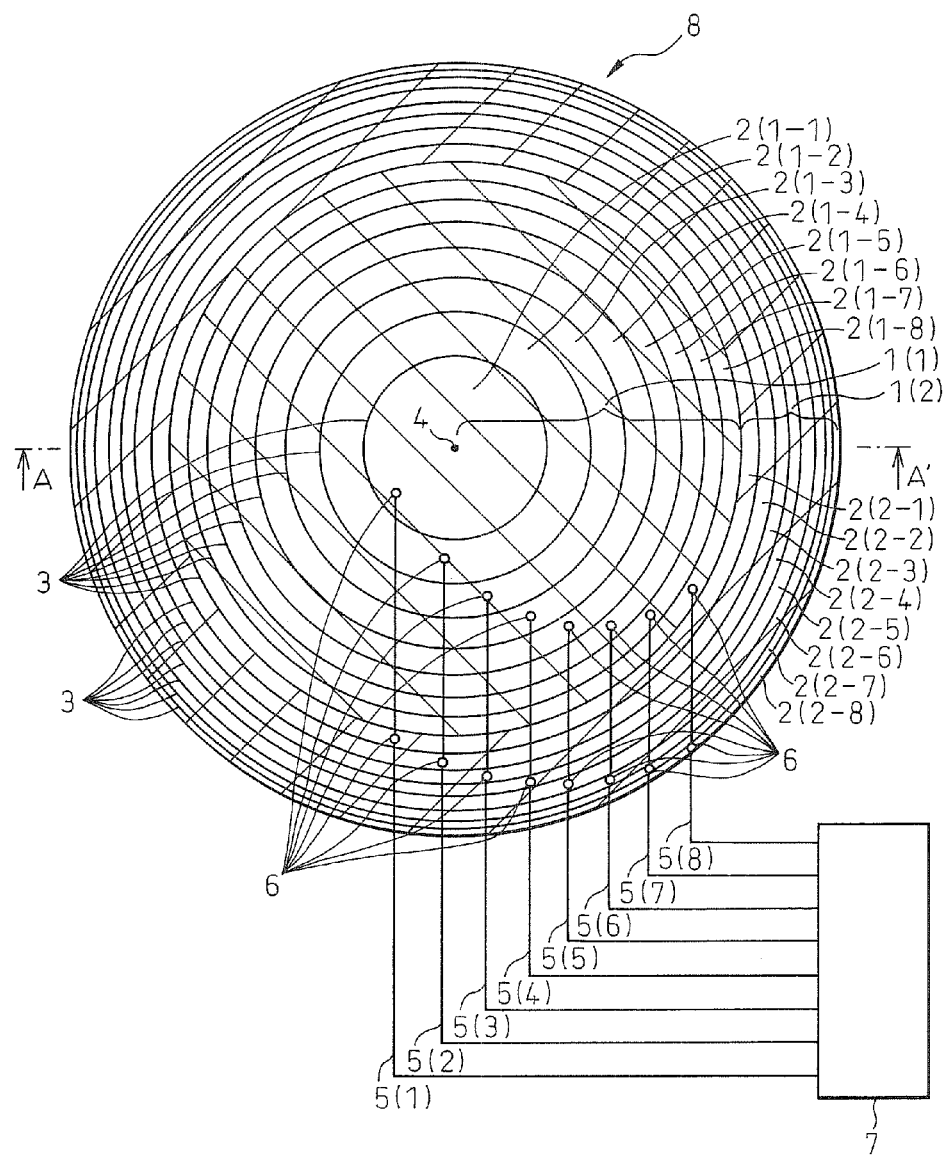
FIG. 12 is a plan view schematically showing a ring-shaped electrode group formed in the prior art liquid crystal Fresnel lens.

In the liquid crystal Fresnel lens 100 according to the present invention, as in the liquid crystal Fresnel lens 30 shown in FIG. 11, the liquid crystal 12 is sandwiched between the top and bottom transparent substrates 11, and the seal material 13 is placed so as to cover the periphery of the liquid crystal 12. The common electrode 9 and ring-shaped electrode group 108 are formed on the sides of the top and bottom transparent substrates 11 that face the liquid crystal 12. In the liquid crystal Fresnel lens 100 according to the present invention, a homogenous liquid crystal is used as the liquid crystal 12, but other kinds of liquid crystals (for example, a homeotropic liquid crystal) may be used. The Fresnel lens 100 further includes alignment films, spacers, etc., though not shown here. The main difference between the liquid crystal Fresnel lens 100 shown in FIG. 1 and the liquid crystal Fresnel lens 30 shown in FIG. 11 lies in the configuration of the ring-shaped electrode group.

In the liquid crystal Fresnel lens 100 according to the present invention, control is performed so as to apply voltage between the common electrode 9 and the concentrically segmented ring-shaped electrode group 108 by varying the voltage for each ring-shaped electrode. The retardation value (R), the difference in refractive index between the long axis and short axis directions of the liquid crystal (birefringence) Δn, and the cell gap d of the liquid crystal layer are related by R=Δn×d. In the liquid crystal Fresnel lens 100, since the cell gap d of the liquid crystal 12 is maintained constant, the retardation distribution is formed by creating a prescribed birefringence distribution by varying the applied voltage to the ring-shaped electrode group 108. The liquid crystal Fresnel lens 100 thus produces a lens effect.

Figure 2:
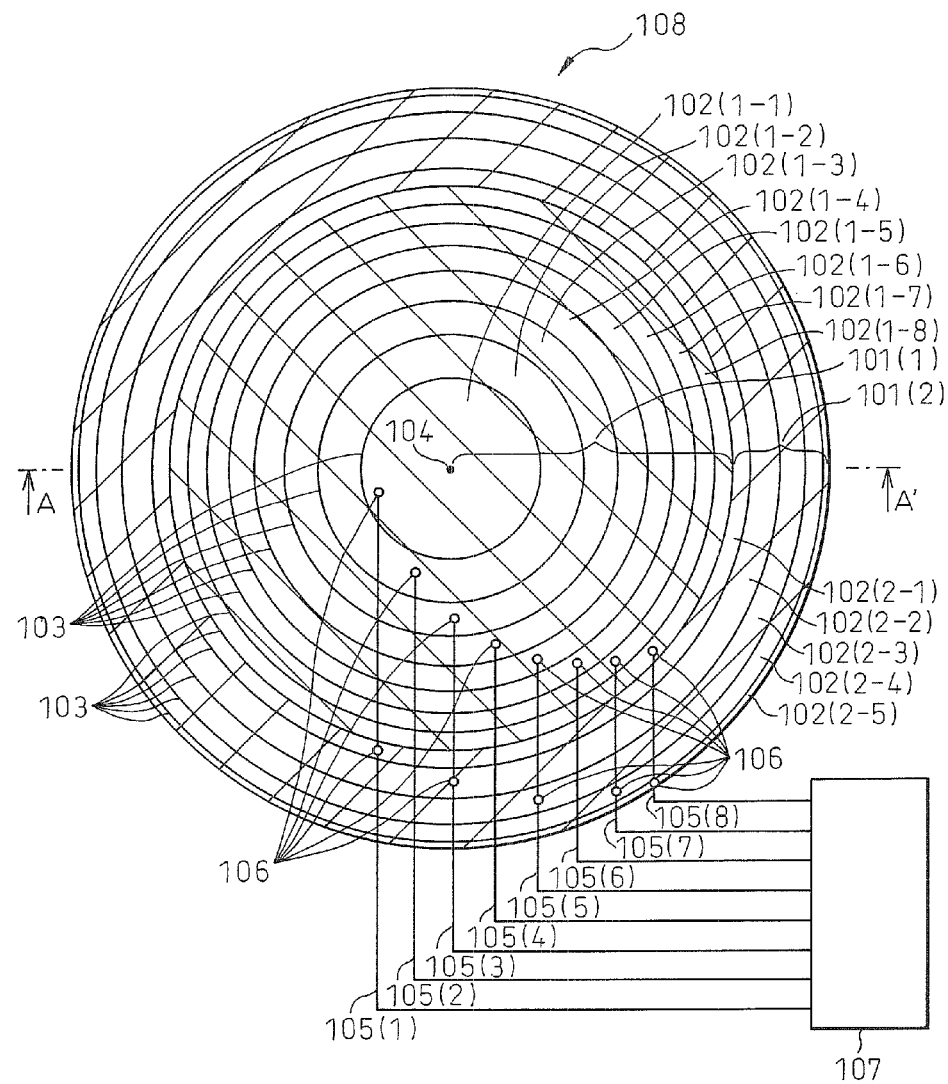
FIG. 2 is a plan view schematically showing the configuration of a ring-shaped electrode group formed in the liquid crystal Fresnel lens according to the present invention.

FIG. 2 is a plan view schematically showing the configuration of the ring-shaped electrode group formed in the liquid crystal Fresnel lens according to the present invention.

As shown in FIG. 2, the ring-shaped electrode group 108 comprises a plurality of ring-shaped electrodes 102 arranged concentrically about the center 104. The ring-shaped electrodes 102 have respective predetermined widths, and are formed in such a manner as to be separated from each other by a prescribed inter-zone gap 103. Lead wires 105 for applying voltages to the respective ring-shaped electrodes 102 are formed on the ring-shaped electrodes 102 by interposing therebetween an insulating layer not shown. Each lead wire 105 is connected to a designated one of the ring-shaped electrodes 102 by means of a via 106. The lead wires 105 are connected to a driver circuit IC 107. The driver circuit IC 107 is connected to a power supply circuit, etc., not shown, and applies a prescribed voltage to each ring-shaped electrode 102 via a corresponding one of the lead wires 105.

Figure 3:
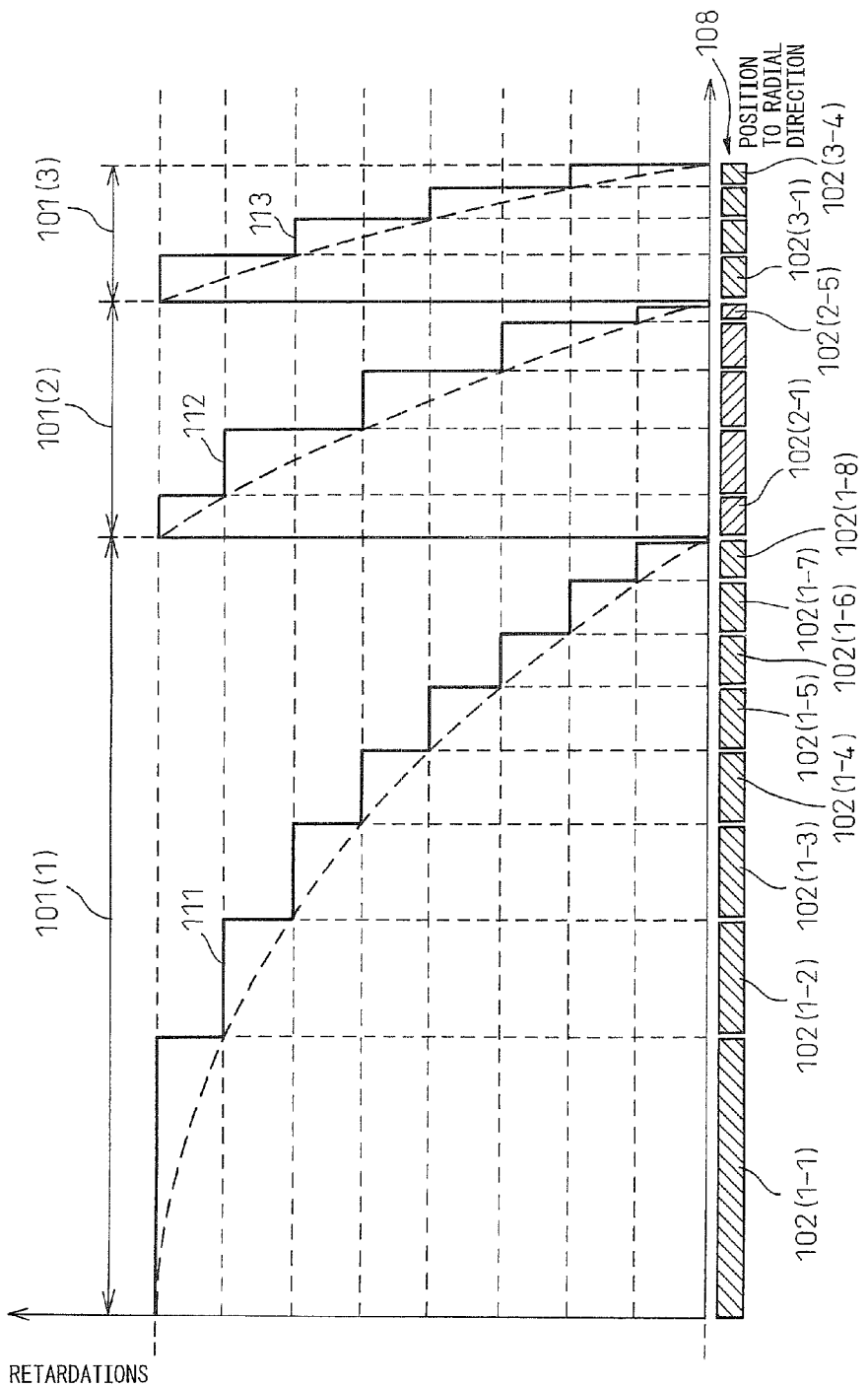
FIG. 3 is a diagram showing the relationship between the ring-shaped electrodes formed in the liquid crystal Fresnel lens of the present invention and the retardations formed in a liquid crystal layer.

FIG. 3 is a diagram showing the relationship between the ring-shaped electrodes formed in the liquid crystal Fresnel lens of the present invention and the retardations formed in the liquid crystal layer. FIG. 3 corresponds to a portion of the AA' cross section of FIG. 2.

As shown in FIG. 3, in the liquid crystal Fresnel lens 100, as in the liquid crystal Fresnel lens 30, a Fresnel lens-like retardation distribution is formed in the liquid crystal layer 12 by using a plurality of lens segments 101. The width of the lens segment 101 across which the retardation distribution is formed becomes smaller as the lens segment 101 is located farther away from the center. That is, compared with the width of the retardation distribution formed by the lens segment (region) 101(1), the width of the retardation distribution formed by the lens segment (region) 101(2) located farther away from the center is small.

However, in the liquid crystal Fresnel lens 100, the number of ring-shaped electrodes 102 for forming the retardation distribution in the lens segment 101 decreases as the lens segment 101 is located farther away from the center and nearer to the outer periphery of the Fresnel lens. This is where the configuration of the liquid crystal Fresnel lens 100 differs from that of the liquid crystal Fresnel lens 30.

As shown in FIGS. 2 and 3, the retardation distribution 111 in the lens segment 101(1) is formed using eight ring-shaped electrodes 102(1-1) to 102(1-8), the retardation distribution 112 in the lens segment 101(2) is formed using five ring-shaped electrodes 102(2-1) to 102(2-5), and the retardation distribution 113 in the lens segment 101(3) is formed using four ring-shaped electrodes 102(3-1) to 102(3-4). For convenience of illustration, only the lens segments 101(1) and 101(2) are shown in FIG. 2.

In the liquid crystal Fresnel lens 100, each ring-shaped electrode 102 in the lens segment 101(2) is supplied with the same driving voltage as that applied to a corresponding one of the ring-shaped electrodes 102 that forms the same retardation in the inwardly located lens segment 101(1). For example, the same driving voltage as that applied to the ring-shaped electrode 102(1-1) is applied to the ring-shaped electrode 102(2-1). Likewise, each ring-shaped electrode 102 in the lens segment 101(3) is supplied with the same driving voltage as that applied to a corresponding one of the ring-shaped electrodes 102 that forms the same retardation in each of the inwardly located lens segments 101(1) and 101(2). For example, the same driving voltage as applied to the ring-shaped electrodes 102(1-8) and 102(2-5) is applied to the ring-shaped electrode 102(3-4).

In the liquid crystal Fresnel lens 100, the retardation distributions in the respective lens segments 101 are formed by applying to each ring-shaped electrode 102 in the outwardly located lens segment 101 the same driving voltage as that applied to the corresponding ring-shaped electrode 102 in the inwardly located lens segment 101. In this way, the liquid crystal Fresnel lens 100 is constructed so that the necessary voltage can be applied to each ring-shaped electrode 102 without increasing the number of lead wires 105.

As described above, the liquid crystal Fresnel lens 100 is constructed so that the retardation distribution in the outwardly located lens segment 101 is formed using a smaller number of ring-shaped electrodes than the number of ring-shaped electrodes used to form the retardation distribution in any of the inwardly located lens segments. Accordingly, the ratio of the area occupied by the inter-zone gap 103, i.e., the region that does not function as a lens, can be prevented from increasing in the outwardly located lens segment 101. It thus is possible to obtain a liquid crystal Fresnel lens that achieves high focusing performance even when the lens has a large diameter.

In the liquid crystal Fresnel lens 100, the retardation distributions in the respective lens segments 101 are each formed using a different number of ring-shaped electrodes 102. However, the present invention is not limited to this particular construction; for example, the liquid crystal Fresnel lens 100 may be constructed so that the retardation distributions in some successively adjacent lens segments 101 are each formed using the same number of ring-shaped electrodes 102.

Figure 4:
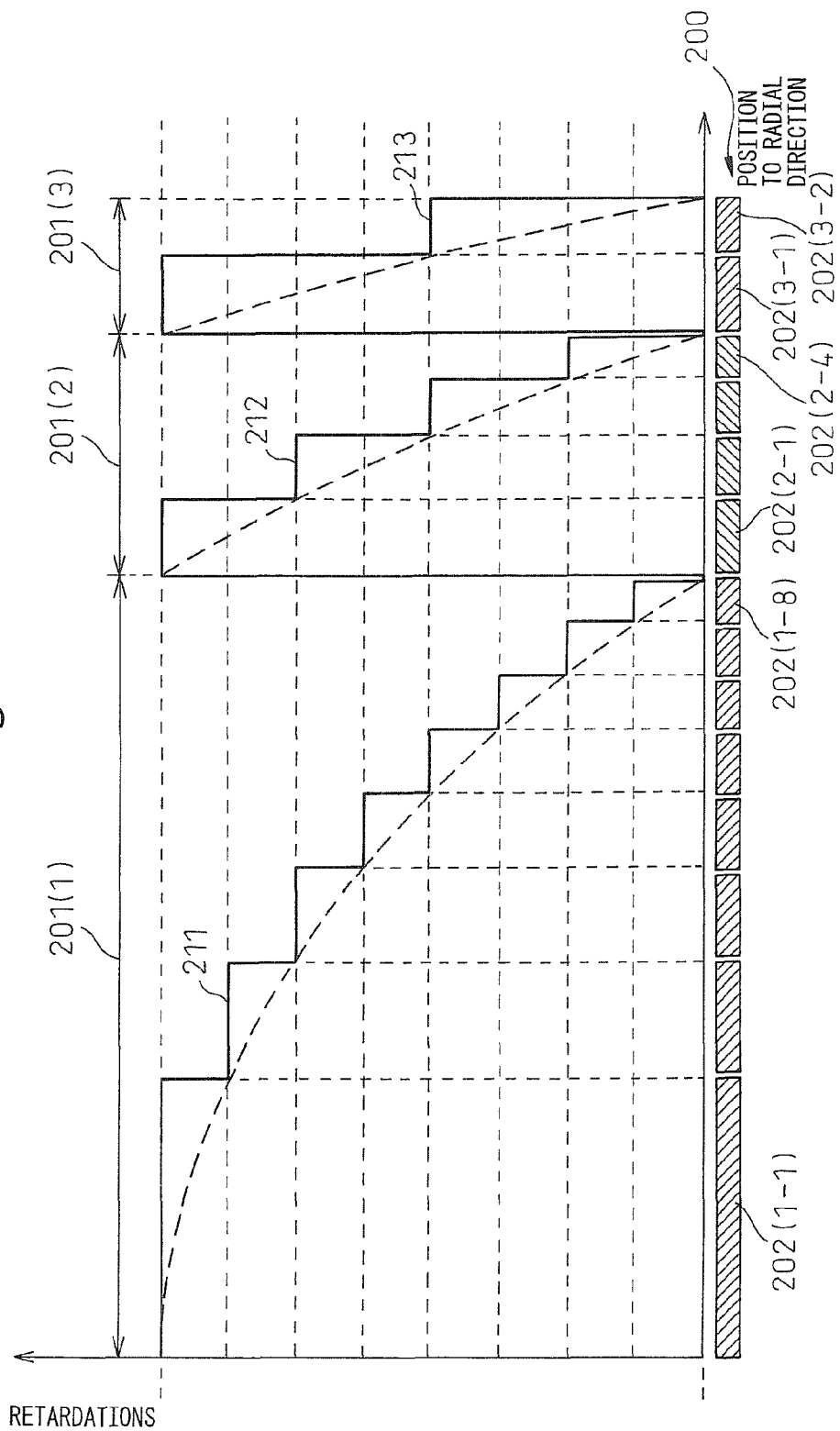
FIG. 4 is a diagram showing the relationship between the ring-shaped electrodes formed in another liquid crystal Fresnel lens of the present invention and the retardations formed in the liquid crystal layer.

FIG. 4 is a diagram showing the relationship between the ring-shaped electrodes formed in another liquid crystal Fresnel lens of the present invention and the retardations formed in the liquid crystal layer.

In the example shown in FIG. 4, the ring-shaped electrode group 108 in the liquid crystal Fresnel lens shown in FIG. 1 is replaced by a modified ring-shaped electrode group 200. In other respects, the configuration is the same as that of the liquid crystal Fresnel lens 100 and will not be further described herein.

In the example shown in FIG. 4, the ring-shaped electrode group 200 comprises a plurality of ring-shaped electrodes 202 and is configured to form retardation distributions using three lens segments (regions) 201(1) to 201(3). As shown in FIG. 4, the retardation distribution 211 in the lens segment 201(1) is formed using eight ring-shaped electrodes 202(1-1) to 202(1-8), the retardation distribution 212 in the lens segment 201(2) is formed using four ring-shaped electrodes 202 (2-1) to 202(2-4), and the retardation distribution 213 in the lens segment 201(3) is formed using two ring-shaped electrodes 202(3-1) and 202(3-2).

In the example of FIG. 4 also, the number of ring-shaped electrodes 202 for forming the retardation distribution in the lens segment 201 decreases as the lens segment 201 is located farther away from the center and nearer to the outer periphery of the Fresnel lens. Accordingly, the ratio of the area occupied by the inter-zone gap, i.e., the region that does not function as a lens, can be prevented from increasing in the outwardly located lens segment 201. It thus is possible to obtain a liquid crystal Fresnel lens that achieves high focusing performance even when the lens has a large diameter.

Figure 5:
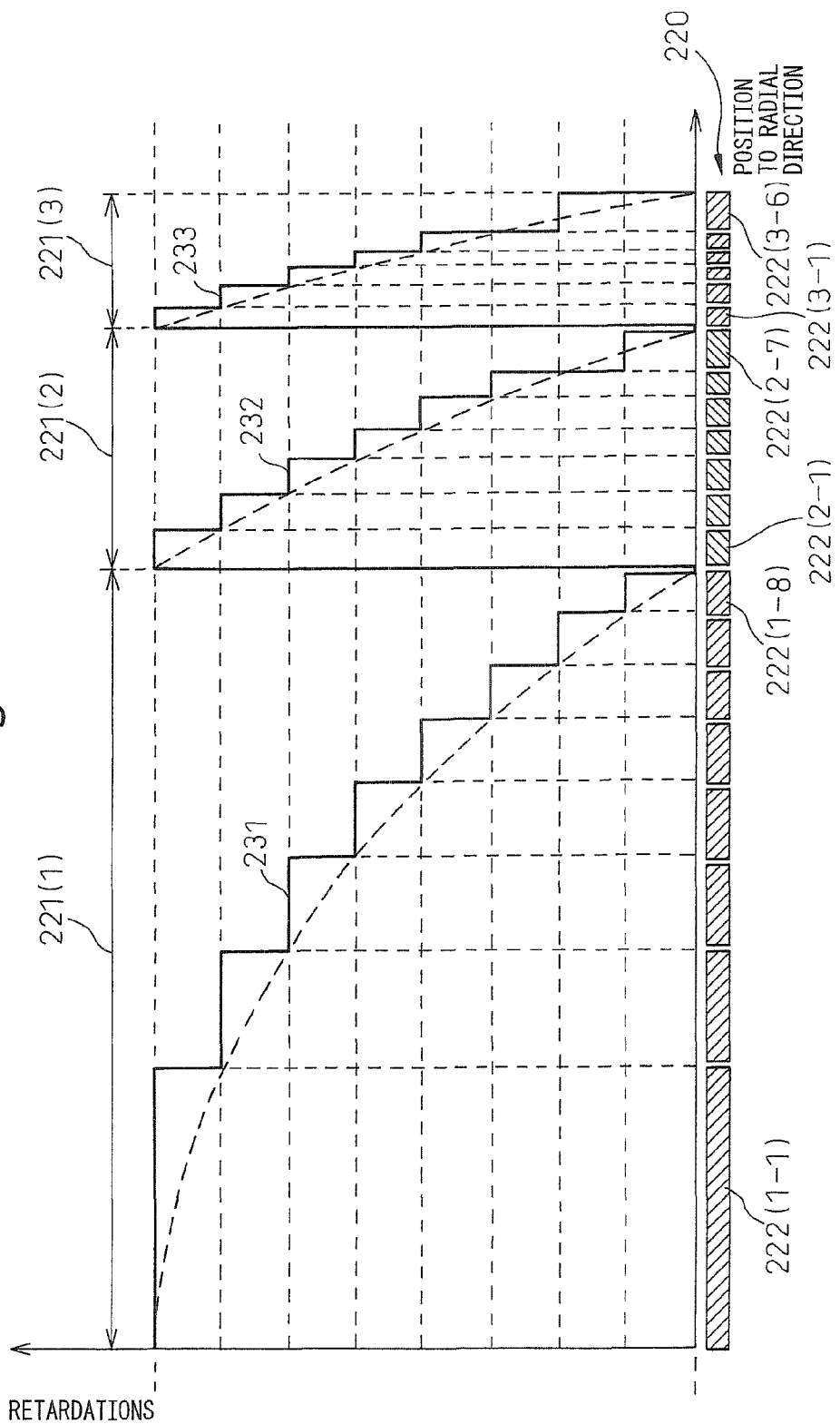
FIG. 5 is a diagram showing the relationship between the ring-shaped electrodes formed in still another liquid crystal Fresnel lens of the present invention and the retardations formed in the liquid crystal layer.

FIG. 5 is a diagram showing the relationship between the ring-shaped electrodes formed in still another liquid crystal Fresnel lens of the present invention and the retardations formed in the liquid crystal layer.

In the example shown in FIG. 5, the ring-shaped electrode group 108 in the liquid crystal Fresnel lens shown in FIG. 1 is replaced by a modified ring-shaped electrode group 220. In other respects, the configuration is the same as that of the liquid crystal Fresnel lens 100 and will not be further described herein.

In the example shown in FIG. 5, the ring-shaped electrode group 220 comprises a plurality of ring-shaped electrodes 222 and is configured to form retardation distributions using three lens segments (regions) 221(1) to 221(3). As shown in FIG. 5, the retardation distribution 231 in the lens segment 221(1) is formed using eight ring-shaped electrodes 222(1-1) to 222(1-8), the retardation distribution 232 in the lens segment 221(2) is formed using seven ring-shaped electrodes 222(2-1) to 222(2-7), and the retardation distribution 233 in the lens segment 221(3) is formed using six ring-shaped electrodes 222(3-1) to 222(3-6).

In the example of FIG. 5 also, the number of ring-shaped electrodes 222 for forming the retardation distribution in the lens segment 221 decreases as the lens segment is located farther away from the center and nearer to the outer periphery of the Fresnel lens. Accordingly, the ratio of the area occupied by the inter-zone gap, i.e., the region that does not function as a lens, can be prevented from increasing in the outwardly located lens segment 221. It thus is possible to obtain a liquid crystal Fresnel lens that achieves high focusing performance even when the lens has a large diameter.

Further, in the example of FIG. 5 also, the retardation distributions in the respective lens segments 221 are formed by applying to each ring-shaped electrode 222 in the outwardly located lens segment 221 the same driving voltage as that applied to the corresponding ring-shaped electrode 222 in the inwardly located lens segment 221. In this way, in the example of FIG. 5 also, the liquid crystal Fresnel lens 100 is constructed so that the necessary voltage can be applied to each ring-shaped electrode 222 without increasing the number of lead wires.

Furthermore, in the example of FIG. 5, in a given lens segment, a certain number of ring-shaped electrodes are combined into one ring-shaped electrode to reduce the ratio of the area of the inter-zone gap. For example, the outermost ring-shaped electrode 222(3-6) in the lens segment 221(3) is equivalent to one that is formed by combining together the ring-shaped electrodes 3(1-6) to 3(1-8) in the lens segment 1(3) of FIG. 13. In this way, by combining a plurality of ring-shaped electrodes into one, the ratio of the area of the inter-zone gap can be reduced.

Figure 6:
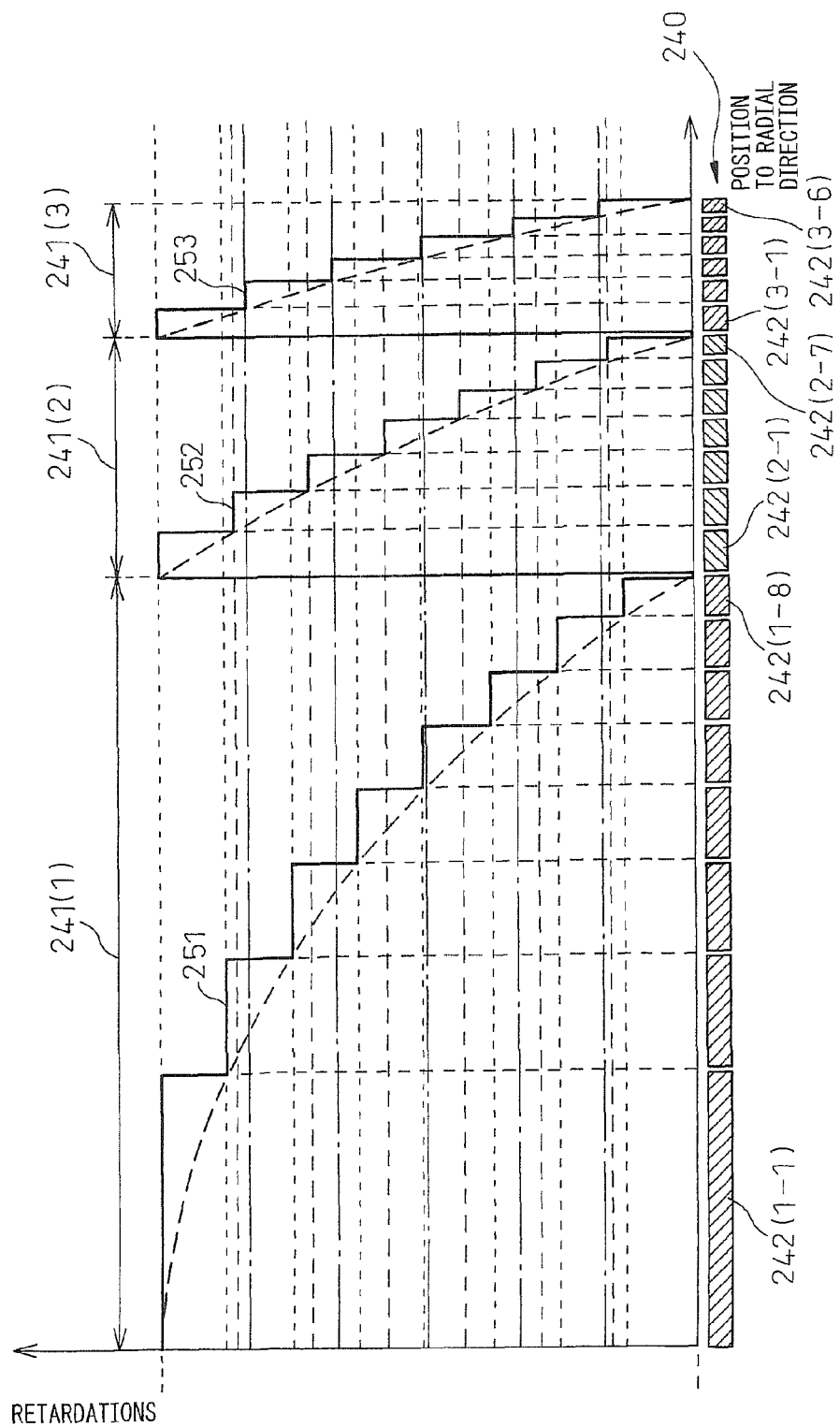
FIG. 6 is a diagram showing the relationship between the ring-shaped electrodes formed in yet another liquid crystal Fresnel lens of the present invention and the retardations formed in the liquid crystal layer.

FIG. 6 is a diagram showing the relationship between the ring-shaped electrodes formed in yet another liquid crystal Fresnel lens of the present invention and the retardations formed in the liquid crystal layer.

In the example shown in FIG. 6, the ring-shaped electrode group 108 in the liquid crystal Fresnel lens shown in FIG. 1 is replaced by a modified ring-shaped electrode group 240. In other respects, the configuration is the same as that of the liquid crystal Fresnel lens 100 and will not be further described herein.

In the example shown in FIG. 6, the ring-shaped electrode group 240 comprises a plurality of ring-shaped electrodes 242 and is configured to form retardation distributions using three lens segments (regions) 241(1) to 241(3). As shown in FIG. 6, the retardation distribution 251 in the lens segment 241(1) is formed using eight ring-shaped electrodes 242(1-1) to 242(1-8), the retardation distribution 252 in the lens segment 241(2) is formed using seven ring-shaped electrodes 242(2-1) to 242(2-7), and the retardation distribution 253 in the lens segment 241(3) is formed using six ring-shaped electrodes 242(3-1) to 242(3-6).

In the example of FIG. 6 also, the number of ring-shaped electrodes 242 for forming the retardation distribution in the lens segment 241 decreases as the lens segment 241 is located farther away from the center and nearer to the outer periphery of the Fresnel lens. Accordingly, the ratio of the area occupied by the inter-zone gap, i.e., the region that does not function as a lens, can be prevented from increasing in the outwardly located lens segment 241. It thus is possible to obtain a liquid crystal Fresnel lens that achieves high focusing performance even when the lens has a large diameter.

Further, in the example FIG. 6, the retardation of each of the ring-shaped electrodes 242 forming the retardation distribution in each lens segment 241 is chosen to have a value equal to the maximum retardation value of the lens segment 241 divided by the number of ring-shaped electrodes contained in the lens segment 241. That is, in each lens segment, the difference in retardation is equal between any two adjacent ring-shaped electrodes. It is therefore necessary to apply voltages for generating such retardations to the respective ring-shaped electrodes 242.

Figure 7:
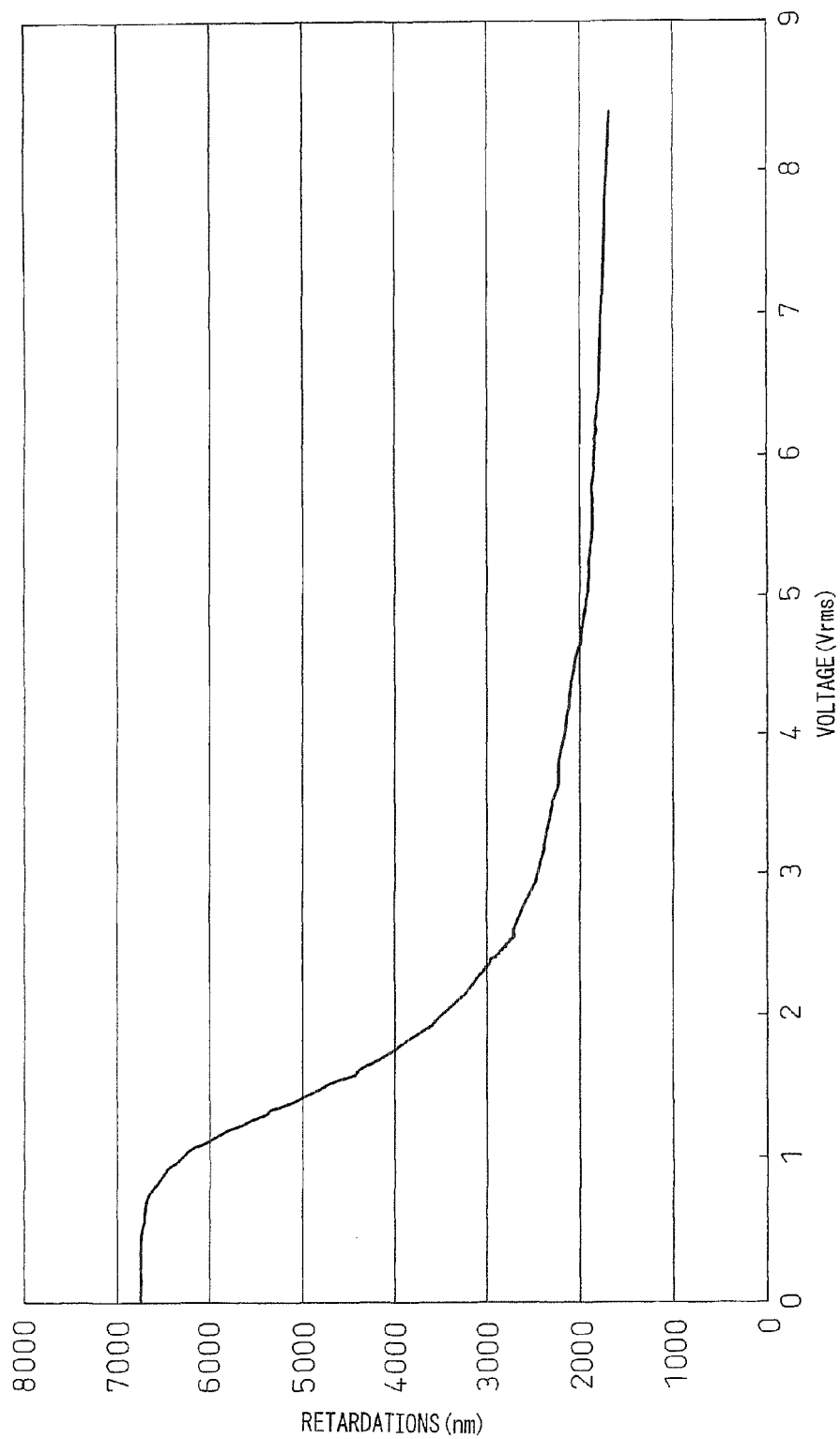
FIG. 7 is a diagram showing the relationship between retardation and applied voltage.

FIG. 7 is a diagram showing the relationship between the retardation and the applied voltage.

FIG. 7 shows the relationship between the applied voltage and the resulting retardation value for the case where a liquid crystal lens with a thickness of 20 μm is fabricated using a homogeneous liquid crystal having a birefringence $\Delta n=0.25$. In practice, the driver IC 107, etc., are controlled so as to apply a voltage for generating a desired retardation in accordance with the liquid crystal used as the liquid crystal 12.

To enhance the focusing performance of the liquid crystal Fresnel lens, it is effective to form a smooth Fresnel lens-like retardation distribution in the liquid crystal layer, and for that purpose, it is desirable to use a large number of ring-shaped electrodes for forming the retardation distribution. For example, in the case of a spectacle lens, a smooth Fresnel lens-like retardation distribution can be formed in the liquid crystal layer by using 20 or more, preferably 30 or more, ring-shaped electrodes in a lens region about 1 mm in radius from the center, though it depends on the diopter value.

EXAMPLE 1

FIGS. 8 and 9 show a design example of the liquid crystal Fresnel lens according to the present invention that achieves 2.5 diopters under the following conditions: the diameter is 15 mm, the birefringence $\Delta n$ of the provided homogeneous liquid crystal is 0.25, and the thickness of the liquid crystal layer is 20 μm. The relationship between the applied voltage and the resulting retardation in the liquid crystal used in this example is the same as that shown in FIG. 7.

To achieve 2.5 diopters, a retardation of about 140000 nm would be required. Further, since the retardation achievable with the liquid crystal layer of 20-μm thickness is about 3000, the number of lens segments was chosen to be 47, and the lens was designed so that a retardation of about 140000 nm could be obtained with the 47 lens segments.

If the liquid crystal Fresnel lens were fabricated with 47 lens segments, the radius of the largest lens segment located in the center would be about 1.1 mm, and the width of the outermost lens segment would be 80 μm or so. In view of this, the number of ring-shaped electrodes for forming the retardation distribution in the center lens segment was chosen to be 25. The inter-zone gap to provide spacing between ring-shaped electrodes was set to 1 μm.

FIG. 8 shows, for some of the lens segments, the retardations obtained by applying driving voltages to the ring-shaped electrodes in each lens segment, the inside radius of each ring-shaped electrode (the distance from the center), the number of ring-shaped electrodes in each lens segment, and the percentage of the area that the inter-zone gap occupies in each lens segment (total inter-zone gap area/lens segment area× 100).

The voltages applied to the respective ring-shaped electrodes were set so that a smooth lens shape would be formed and so that the necessary retardations would be obtained. In the largest lens segment region located in the center, respectively different voltages were applied to the 25 ring-shaped electrodes from a designated driver IC, etc.

The width of the lens segment 1 across which the retardation distribution is formed becomes smaller as the lens segment 1 is located farther away from the center. That is, while the width of the center lens segment 1(1) is about 1100 μm, the width of the lens segment 1(2) located one segment outward is less than one half, i.e., about 450 μm.

In the example shown here, the number of ring-shaped electrodes for forming the retardation distribution in the center lens segment is 25, while the number of ring-shaped electrodes in each of the second to fifth lens segments 1(2) to 1(5) from the center is 13. Further, the number of ring-shaped electrodes in each of the sixth to 11th and 12th lens segments 1(6) to 1(11) and 1(12) from the center is 9, and the number of ring-shaped electrodes in each of the 13th to 21st lens segments 1(3) to 1(21) from the center is 7. Further, the number of ring-shaped electrodes in each of the 22nd to 41st to 47th (last) lens segments 1(22) to 1(41) to 1(47) from the center is 4. The lens segments 1(1) to 1(11) are shown in FIG. 8, while the lens segments 1(12) to 1(47) are shown in FIG. 9.

In the example shown here, the number of ring-shaped electrodes for forming the retardation distribution (refractive index distribution) in the lens segment 1 decreases as the lens segment 1 is located farther away from the center and nearer to the outer periphery of the Fresnel lens. As a result, the percentage of the inter-zone gap area, which is 3.00% in the center lens segment 1(1), is 2.70% in the lens segment 1(2), 3.44% in the lens segment 1(6), 3.88% in the lens segment 1(13), and 3.76% in the lens segment 1(47). In this way, the percentage can be held below 5% even in the outwardly located narrow lens segment (for example, the lens segment 1(47)), thus suppressing the increase in the ratio of the area occupied by the inter-zone gap, i.e., the region that does not function as a lens. In the design example shown here, it is possible to obtain a liquid crystal Fresnel lens that achieves high focusing performance, compared with the prior art, even when the lens has a large diameter.

Further, in the example shown here, the number of ring-shaped electrodes for forming the retardation distribution in the center lens segment 1(1) was chosen to be 25. As a result, the retardation distribution in the lens segment 1(1) is divided into 24 parts by the ring-shaped electrodes.

The number of parts into which the retardation distribution in each outwardly located lens segment 1 (each lens segment 1, other than the center lens segment 1) is divided by the ring-shaped electrodes is set equal to an integral submultiple of the number of such parts in the center lens segment 1. Accordingly, the same voltage as the voltage applied to a given ring-shaped electrode in the center lens segment 1 can be applied to a corresponding one of the ring-shaped electrodes in each outwardly located lens segment 1, and this offers the effect that the total number of voltages to be supplied can be reduced.

In the example shown here, the number of parts into which the retardation distribution in the center lens segment 1 is divided by the ring-shaped electrodes has been set to 24 into which many numbers divide evenly. As a result, the number of parts into which the retardation distribution in each outwardly located lens segment 1 is divided by the ring-shaped electrodes can be set equal to any one of the many numbers, such as 12, 8, 6, and 3, that divide into 24. In this way, even when the number of lens segments 1 is large, the retardation distribution in each lens segment 1 can be formed in a gently sloping fashion by using an appropriate number of ring-shaped electrodes and without increasing the number of lead wires.

As shown in the above example, the retardation distributions in some successively adjacent lens segments 1 may each be formed using the same number of ring-shaped electrodes.

In the above example, the distance of each ring-shaped electrode from the center is given by rounding off the measured value to an appropriate digit place. Further, in the above example, the number of lens segments, the number of ring-shaped electrodes for forming the retardation distribution in each lens segment, the distance of each ring-shaped electrode from the center, etc., are given only for illustrative purposes and are not restricted to those given above.

The liquid crystal Fresnel lens of the above example has been designed by considering the retardation that can be achieved with the liquid crystal even when the temperature of the operating environment varies to some extent. However, if the operating temperature range is limited, the liquid crystal Fresnel lens can be designed by increasing the amount of retardation of each lens segment and thereby reducing the number of lens segments.

Furthermore, in the above example, by applying the same driving voltage to all the ring-shaped electrodes, the liquid crystal Fresnel lens can be put in a condition that does not produce any lens effect. It is also possible to form a lens having various diopters by applying a suitable driving voltage to each individual ring-shaped electrode and thereby forming a desired refractive index distribution.

In the case of a liquid crystal lens of the type that forms a non-segmented lens-like retardation distribution in a liquid crystal layer, if the retardation of about 140000 nm necessary to obtain 2.5 diopters is to be achieved, the birefringence Δn of the liquid crystal, the thickness of the liquid crystal layer, and the liquid crystal driving voltage will have to be increased. It is therefore difficult to achieve the desired lens with such a liquid crystal panel because of such deficiencies as the slow liquid crystal response of the order of seconds and the large power supply required to drive the liquid crystal. Accordingly, if the retardation as large as about 140000 nm that becomes necessary to obtain 2.5 diopters is to be achieved, it becomes necessary to provide a liquid crystal Fresnel lens configuration, such as described above, that forms a Fresnel lens-like retardation distribution in the liquid crystal layer by dividing the lens into a plurality of lens segments.

Comparative Example

FIG. 10 shows a comparative design example of a liquid crystal Fresnel lens that achieves 2.5 diopters under the following conditions: the diameter is 15 mm, the birefringence Δn of the sandwiched homogeneous liquid crystal is 0.25, and the thickness of the liquid crystal layer is 20 μm.

In the design example shown in FIG. 10, the lens was divided into 47 lens segments in order to achieve 2.5 diopters, as in the design example described in the above example 1, but the 47 lens segments were each designed to have 25 ring-shaped electrodes. The inter-zone gap was set to 1 μm.

As shown in FIG. 10, the percentage of the inter-zone gap area, which is 3.00% in the center lens segment 1(1), increases up to 19.84% in the 21st lens segment 1(21) and increases to as large as 27.91% in the 41st lens segment 1(41). In this way, the percentage of the inter-zone gap area in the lens segment increases as the lens segment is located nearer to the outer periphery of the Fresnel lens, and thus the region that in effect contributes to focusing decreases toward the outer periphery.

It is generally said that if the percentage of the inter-zone gap area exceeds 5%, problems occur such as degradation of focusing performance and reduction in the amount of light transmitted. In contrast, in the design example of the present invention, the percentage of the inter-zone gap area is held below 5% in each of the 47 lens segments, and thus it can be seen that the lens functions as a good liquid crystal Fresnel lens.

What is claimed is:

1. A liquid crystal Fresnel lens comprising:
   a concentrically segmented ring-shaped electrode group, which includes a first plurality of ring-shaped electrodes and a second plurality of ring-shaped electrodes;
   a common electrode disposed opposite said ring-shaped electrode group;
   a liquid crystal layer provided between said ring-shaped electrode group and said common electrode;
   a first lens segment region which includes said first plurality of ring-shaped electrodes from said ring-shaped electrode group, and which forms a first retardation distribution by utilizing said first plurality of ring-shaped electrodes; and
   a second lens segment region which includes said second plurality of ring-shaped electrodes from said ring-shaped electrode group, said second plurality of ring-shaped electrodes being located outwardly of said first plurality of ring-shaped electrodes, and which forms a second retardation distribution by utilizing said second plurality of ring-shaped electrodes,
   wherein each retardation level in said first and second retardation distributions is formed by a single ring-shaped electrode,
   a Fresnel lens-like retardation distribution is formed across said first and second lens segment regions, and
   the number of retardation levels in said second retardation distribution formed in said second lens segment region is smaller than that in said first retardation distribution formed in said first lens segment region.

2. The liquid crystal Fresnel lens according to claim 1, further comprising diving voltage application means for applying a given driving voltage to a designated one of said first plurality of ring-shaped electrodes that generates a given retardation and applying the same given driving voltage to a corresponding one of said second plurality of ring-shaped electrodes that generates a retardation identical to said given retardation.

3. The liquid crystal Fresnel lens according to claim 1, wherein in said first lens segment region, said first plurality of ring-shaped electrodes are formed so that the difference between the retardations generated by said ring-shaped electrodes becomes equal between any two adjacent ones of said ring-shaped electrodes.

4. The liquid crystal Fresnel lens according to claim 1, wherein the number of said second plurality of ring-shaped electrodes is made smaller than the number of said first plurality of ring-shaped electrodes by combining a prescribed number of ring-shaped electrodes into one electrode.

5. The liquid crystal Fresnel lens according to claim 1, wherein a maximum retardation level in said first lens segment region is equal to that in said second lens segment region, and a difference in retardation between any two adjacent ring-shaped electrodes in each of said first and second lens segment regions is equal to a value obtained by dividing said maximum retardation level by the number of said ring-shaped electrodes therein.

* * * * *